E. PHILLIPSON.
ELECTRIC HEATING APPARATUS.
APPLICATION FILED MAY 31, 1921.

1,431,418.

Patented Oct. 10, 1922.
2 SHEETS—SHEET 1.

Inventor
Emil Phillipson
By Conrad A Dieterich
his Attorney

E. PHILLIPSON.
ELECTRIC HEATING APPARATUS.
APPLICATION FILED MAY 31, 1921.
1,431,418.
Patented Oct. 10, 1922.
2 SHEETS—SHEET 2.
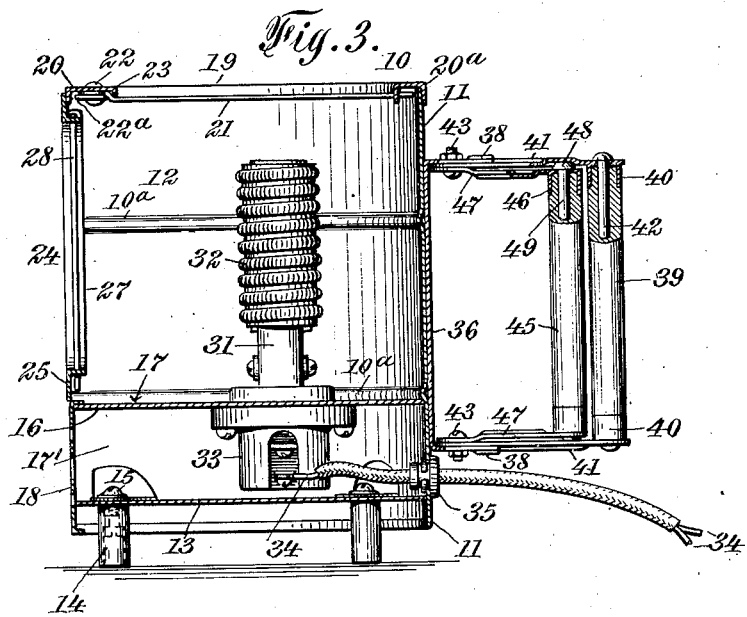
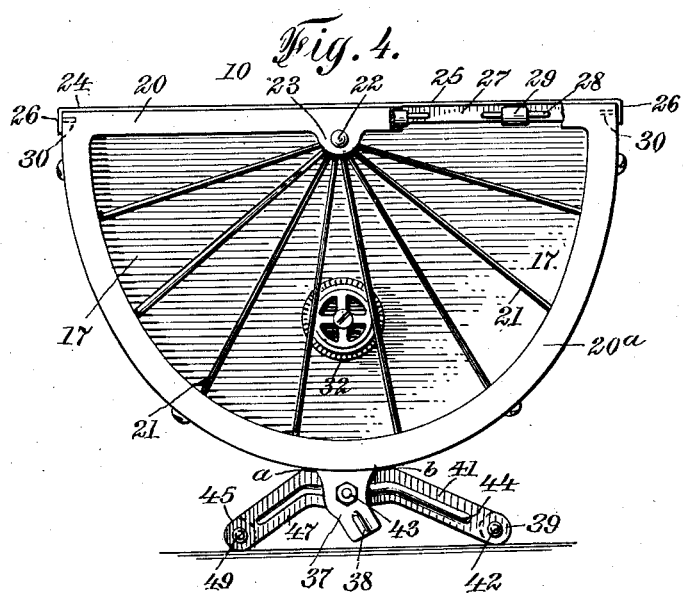
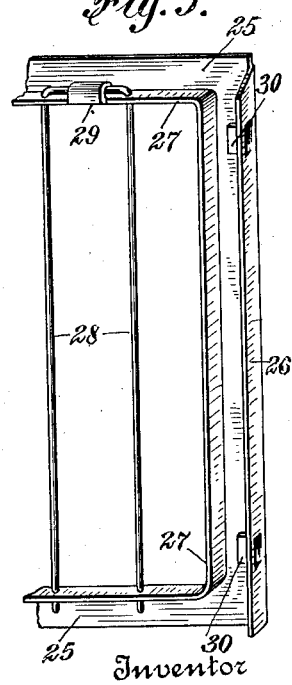
Inventor
Emil Phillipson
By Conrad A. Dieterich
his Attorney Patented Oct. 10, 1922.

1,431,418

UNITED STATES PATENT OFFICE.

EMIL PHILLIPSON, OF NEW YORK, N. Y.

ELECTRIC HEATING APPARATUS.

Application filed May 31, 1921. Serial No. 474,040.

*To all whom it may concern:*

Be it known that I, EMIL PHILLIPSON, a citizen of the United States, residing at the city of New York, borough of the Bronx, Bronx County, in the State of New York, have invented certain new and useful Improvements in Electric Heating Apparatus, of which the following is a full, clear, and exact specification.

My invention relates to improvements in electric heating apparatus, and the same has for its object more particularly to provide an apparatus affording a more extensive distribution of the heat than is possible with the usual forms of electric heating apparatus.

Further, said invention has for its object to provide an electric heating apparatus in which the heat is distributed horizontally in the segment of a circle of large area.

Further, said invention has for its object to provide an electric heating apparatus in which the emitted heat is projected both horizontally and vertically in order to provide a more extensively heated space or zone.

Further, said invention has for its object to provide an electric heating apparatus in which the emitted heat is projected by the joint action of a plurality of separate reflecting members arranged at an angle to one another.

Further, said invention has for its object to provide an electric heating apparatus which shall effectively heat the largest possible space at a minimum expenditure of electric energy.

Other objects will in part be obvious and in part be pointed out hereinafter.

To the attainment of the aforesaid objects and ends, my invention consists in the novel details of construction, and in the combination, connection and arrangement of parts hereinafter more fully described and then pointed out in the claims.

In the accompanying drawings—

Fig. 3 is a section taken essentially on the line 3—3 of Fig. 2;

Fig. 4 is an end view showing the handles adjusted to serve as leg members to support the apparatus in horizontal position; and Fig. 5 is an enlarged detail perspective view showing one end of the front protective guard and the fastening means therefor.

Figure 1:
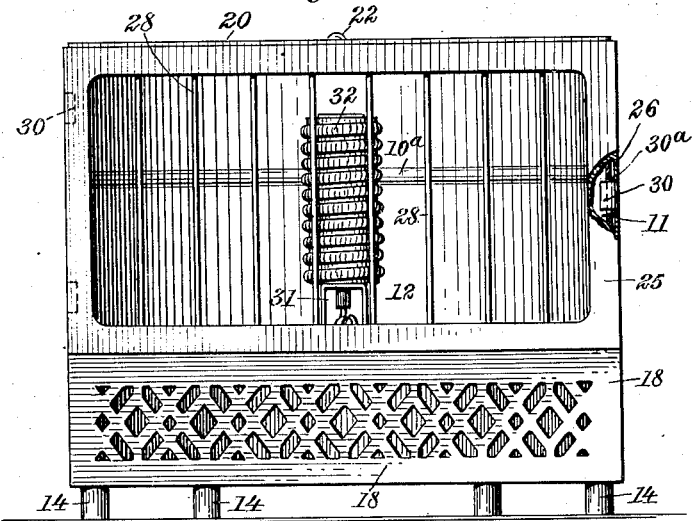
Figure 1 is a front view showing one form of electric heating apparatus constructed according to, and embodying my said invention.

In said drawings, the apparatus is shown composed of a casing 10 comprising a substantially semi-circular or parabolic vertical wall member 11, preferably made of sheet-metal, such as copper, or other suitable material, having an inner surface polished or otherwise treated to form a reflecting surface 12.

Adjacent to the lower edge of said vertical wall member is secured a bottom 13 provided upon its under side with feet 14 which are secured to said bottom by screw 15 passing through the same. 16 denotes a false bottom or partition also preferably made of sheet copper, or other suitable material, having its upper surface polished or otherwise treated to form a reflecting surface 17. The bottom or partition 16 is secured at its edge to the inner side of the vertical wall member 11 above the bottom 13 so as to form a compartment 17' whose front portion is covered by a grill or perforated plate 18 secured to the forward edges of said wall member 11, bottom 13 and false bottom 16.

19 denotes a protective guard comprising a front member 20, and a curved member 20ª. The said curved member 20ª is formed of a U-shaped bar having openings provided in its inner side in which are secured the outer ends of rods 21 whose forward ends are brought together and secured by a rivet 22 and washer 22ª to the under side of a projection 23 extending inwardly from the front member 20 of the guard 19.

24 denotes a guard for the front of the casing 10, which comprises a rectangular frame 25 having rearwardly extending flanges 26 at its opposite side, and a rearwardly extending inner, peripheral flange 27. The horizontal portions of said flange 27 are provided with registering apertures to receive the longitudinal members of wire staples 28 which are secured in place by the engagement of their transverse members with the inwardly bent projections 29 provided upon the upper horizontal flange portion 27.

One of the vertical flanges 26 is provided midway of its ends with an integrally-formed inwardly-extending projection 30, and the other of said flanges 26 is provided adjacent to its upper and lower ends with similar projections 30. The said projections 30 are adapted to be received by recesses 30ª provided in the side wall member 11 adjacent to its front vertical edges in order to hold the front guard 24 detachably secured to said casing 10.

31 denotes an insulating support secured to the false bottom or partition 16 at the focal point of the reflector 12, and upon said support is secured a suitable resistance element 32 whose terminals extend to an insulating base 33 secured to the under side of the false bottom 16 to permit of the attachment of said terminals to the conductors 34 extending through an insulating sleeve 35 in the casing 10.

In order to reinforce the casing 10, the same may be provided with one or more integrally-formed ribs 10ª.

To form a convenient means for carrying the apparatus, as well as to provide means for supporting the same in a horizontal position, the apparatus is provided upon the outer central portion of its vertical wall 11 with a bail 36 whose flat intermediate portion is soldered or otherwise rigidly secured to the casing 11, and has its ends 37 free and extending outwardly and provided with struck-up longitudinal ribs 38.

39 denotes a handle having its ends secured in sockets 40 of the handle members 41 by a pin 42. The inner ends of the members 41 are pivotally secured by rivets or screws 43 to the ends 37 of the bail 36, and are provided with longitudinal reinforcing ribs 44 whose outer surfaces are adapted to engage with the recesses formed in the under sides of the ribs 38 on said ends 37 to hold the handle 39 to the carrying position shown in full lines at Figs. 2 and 3.

45 denotes a similar handle having its ends similarly secured in sockets 46 of shorter handle members 47 whose inner ends are also pivotally mounted upon the screws 43. The heads 48 at the opposite ends of the pin 49 are adapted to engage with the under or recessed side of the longitudinal reinforcing ribs 44 of the handle members 41 in order to hold the handle 45 in such position with respect to the handle 39 that the two handles 39, 45 will serve as a single handle, as shown at Figs. 2 and 3.

The operation of the apparatus is largely obvious.

In operation, the greater part of the heat emitted by the element 32, that is to say, the horizontally projected rays, will be received upon and reflected horizontally by the curved or parabolic reflector 12, while the downwardly and downwardly-inclined rays will be received upon and reflected upwardly and forwardly by the flat, base reflector 17. By this construction and arrangement of reflecting surface a part of the heat will be distributed laterally in the arc of a circle of approximately 100 degrees, and vertically in the arc of a circle of approximately 90 degrees, thereby insuring a combined distribution of heat over a large area or space.

Figure 2:
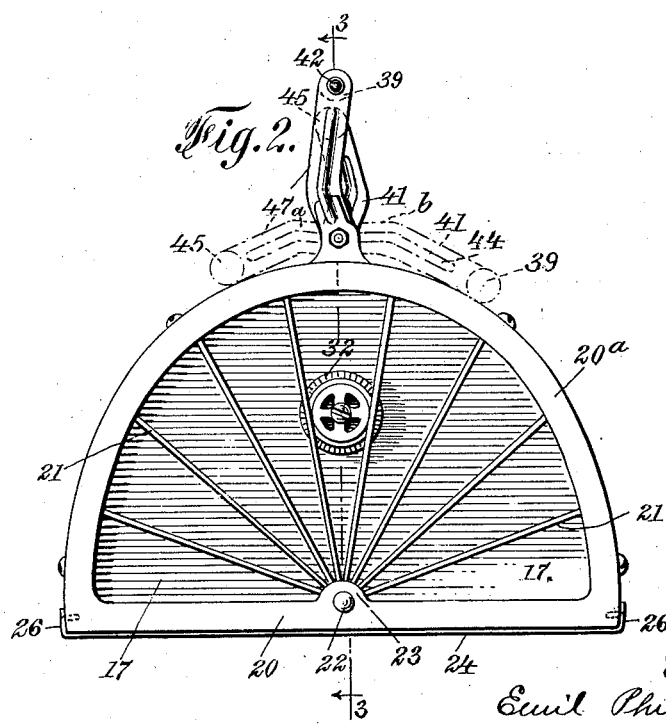
Fig. 2 is a top view thereof showing the handles in full lines adjusted to carrying position, and in broken lines, folded back for shipping purposes.

Under ordinary circumstances, the apparatus is intended to be used in the position illustrated in Figures 1 and 2, in which the same rests upon the feet 14. When the current is conducted to the resistance element, the heat will be doubly reflected, i. e., one reflection being produced by the semi-circular or parabolic reflector 12, and the other being produced by the upper surface of the partition or false bottom 16. By this arrangement, the major portion of the heat is projected horizontally outwardly in a flaring direction covering approximately 100°, and vertically upwardly by the horizontal reflecting surface 16. By this construction and arrangement, a more extensive distribution of the heat is obtained than is possible in the ordinary electric heaters having the usual form of parabolic reflector, or those in which only a single reflector is used.

When it is desired to support the apparatus in a horizontal position, as illustrated in Fig. 4, it merely becomes necessary to adjust the handle 45 by forcing the same outwardly (to the left in Fig. 2) until the portion $a$ engages with the outer surface of the vertical wall 11 of the apparatus, and then adjust the handle 39 until the portion $b$ thereof engages the outer surface of the casing 11. When the handle parts have been thus adjusted, they will serve to support the apparatus, as shown in Fig. 4. In this position, the main portion of the heat produced by the apparatus will be projected upwardly by the semi-circular or parabolic reflecting surface 12, and a smaller or less amount of the heat projected horizontally outwardly by the reflecting surface 16 formed by the base or partition of the casing. In this position, the apparatus may be employed for toasting bread, or the like, or for cooking or heating any article which can be upon the guard 24.

When the apparatus is not in use, or is to be packed for shipment, it merely becomes necessary to fold the shorter handle 45 to the left, as indicated in Fig. 2, and the longer handle 39 to the right.

Having thus described my said invention what I claim and desire to secure by Letters Patent is:

1. An apparatus of the character described comprising a heat emitting element, and reflecting means comprising a vertically curved member for horizontally projecting the laterally emitted heat rays, and a flat base reflector arranged at right angles to said vertical member for vertically projecting the downwardly and angularly emitted heat rays, substantially as specified.

2. An apparatus of the character described comprising a heat emitting element, reflecting means comprising a vertically curved member for horizontally projecting the laterally emitted heat rays, and a flat base reflector arranged at right angles to said vertical member for vertically projecting the downwardly and angularly emitted heat rays, and means for supporting said apparatus in a plurality of positions at angles to one another, substantially as specified.

3. An apparatus of the character described comprising a heat emitting element, reflecting means comprising a vertically curved member for horizontally projecting the laterally emitted heat rays, and a flat base reflector arranged at right angles to said vertical member for vertically projecting the downwardly and angularly emitted heat rays, and protective guards for the top and the front of said apparatus, substantially as specified.

4. An apparatus of the character described comprising a casing, reflecting surfaces therein, a heat emitting element, a bearing secured to said casing, and a pair of handle members pivotally secured to said bearings, adapted, in one position, to service as a carrying means for said apparatus, and in another position to serve as a support therefor, substantially as specified.

5. An apparatus of the character described comprising a casing, reflecting surfaces therein, a heat emitting element, a bearing, a pair of handle members adjustably mounted in said bearing, means for holding said handle members, in one position, interlocked and rigid with said casing in order to serve as a carrying handle, and permit of said handle members being folded against said casing to serve as a support for said apparatus, substantially as specified.

6. An apparatus of the character described comprising a casing, reflecting means therein, a heat emitting element, a pair of bearings extending from said casing, engageable means thereon, a pair of handle members arranged one within the other and conjointly secured to said bearings, one of said handle members being provided with engaging means adapted to cooperate with the engageable means on said bearings to hold said handle member fixed with respect thereto, and the other of said handle members provided with means adapted to engage with registering means on said first-named handle member whereby to hold said second-named handle member locked to said first-named handle member, substantially as specified.

7. An apparatus of the character described comprising a casing, reflecting means therein, a heat emitting element, a pair of bearings extending from said casing and provided with longitudinal recesses, a pair of handle members arranged one within the other, and conjointly, pivotally secured to said bearings, recessed projections on one of said handle members adapted to engage with the longitudinal recesses in said bearings whereby to hold said handle locked with respect to said casing, and projections upon the other of said handle members adapted to engage with the recessed projections in said first-named handle member whereby to hold said second-named handle member locked to said first-named handle member, substantially as specified.

Signed at the city of New York, in the county and State of New York, this eleventh day of May, one thousand nine hundred and twenty-one.

EMIL PHILLIPSON.

Witnesses:
CONRAD A. DIETERICH,
LOUIS B. HASBROUCK.